United States Patent [19]

Yamauchi et al.

[11] Patent Number: 5,345,829
[45] Date of Patent: Sep. 13, 1994

[54] METHOD FOR PREDICTING ABNORMALITY OF MECHANICAL SEAL AND APPARATUS FOR PREDICTING SAME

[75] Inventors: Yuji Yamauchi, Tokyo; Kenji Inoue, Kitakyusyu, both of Japan

[73] Assignee: Tanken Seiko Kabushiki Kaisha, Tokyo, Japan

[21] Appl. No.: 124,380

[22] Filed: Sep. 20, 1993

Related U.S. Application Data

[63] Continuation of Ser. No. 688,863, Apr. 19, 1991, abandoned.

[30] Foreign Application Priority Data

Apr. 23, 1990 [JP] Japan ................................. 2-105291

[51] Int. Cl.⁵ ............................................. G01M 19/00
[52] U.S. Cl. ........................................ 73/865.9; 277/2
[58] Field of Search ................. 73/865.9; 324/207.22, 324/207.23, 207.24, 207.26, 240, 241, 242, 237, 238; 364/507, 561; 356/373, 374, 237; 277/2

[56] References Cited

U.S. PATENT DOCUMENTS

| | | | |
|---|---|---|---|
| 3,201,996 | 8/1965 | Silvia | 73/865.9 |
| 4,677,291 | 6/1987 | Ellingson | 356/373 X |
| 4,692,699 | 9/1987 | Brunet et al. | 324/207.26 X |
| 4,901,558 | 2/1990 | Leining et al. | 73/45.4 X |
| 4,930,345 | 6/1990 | Bausch | 73/45.4 |
| 4,955,226 | 9/1990 | Beaty et al. | 73/49.3 |
| 5,036,236 | 6/1991 | Wilson | 324/207.26 X |
| 5,092,612 | 3/1992 | Victor et al. | 277/96.1 |
| 5,198,763 | 3/1993 | Konishi | 324/207.22 X |

FOREIGN PATENT DOCUMENTS

| | | | |
|---|---|---|---|
| 3237950 | 5/1984 | Fed. Rep. of Germany . | |
| 652380 | 3/1979 | U.S.S.R. | 73/865.9 |
| 903731 | 2/1982 | U.S.S.R. | 73/865.9 |
| 941864 | 7/1982 | U.S.S.R. | 73/865.9 |
| 1166767 | 10/1969 | United Kingdom . | |

*Primary Examiner*—Thomas P. Noland
*Attorney, Agent, or Firm*—Nields & Lemack

[57] ABSTRACT

A method for predicting abnormality of a mechanical seal comprises detecting a displacement in the radial direction of a slidable ring of a mechanical seal and predicting abnormality of the mechanical seal from the displacement detected which represents the extent of adhesion of the slidable ring against the rotary shaft.

6 Claims, 7 Drawing Sheets

METHOD FOR PREDICTING ABNORMALITY OF MECHANICAL SEAL AND APPARATUS FOR PREDICTING SAME

This application is a continuation of application Ser. No. 07/688,863 filed Apr. 19, 1991 and now abandoned.

FIELD OF THE INVENTION

The present invention relates to a method for predicting abnormality of a mechanical seal and an apparatus for predicting same.

BACKGROUND OF THE INVENTION

Mechanical seals are utilized for sealing a space between a rotary shaft and a casing of a machine to which the rotary shaft is adapted. Mechanical seals include a rotary ring mounted on the rotary shaft with a packing and a non-rotary ring mounted on the casing with a packing. The rings form sealing faces which seal said space. One of the rings is slidable in the axial direction of the rotary shaft and it is forced to be slidably in contact with another ring at the sealing face by springs and pressure of a medium to be sealed. The slidable ring compensates wear of the sealing faces or follows the vibration of the shaft or the like.

Mechanical seals are more reliable than other sealing device, for example gland packings. However even with mechanical seals, leakage of contents to be sealed sometimes happens. The medium is leaked from the sealing face or from the gap between the rotary ring and the rotary shaft due to the poor sealing thereof. The sealing faces sometimes happen to be separated each other due to the vibration of the rotary shaft or the like and due to wear of the faces. As described above, one of the sealing ring is mounted so slidable as to compensate the wear and to follow the movement in the axial direction of the rotary shaft. However the slidable ring can follow only some extent of vibration of the rotary shaft. In an agitator or the like where a longer rotary shaft is equiped thereon, the mechanical seal mounted on the shaft often causes the leakage due to the vibration of the longer rotary shaft. Furthermore the slidable ring have a tendency to become adhered on the rotary shaft which prevents slide movement of the ring. Such adhesion of the slidable ring is caused by many reasons, for example invasion of slurry into the gap between the slidable ring and the rotary shaft, bite of the packing into the gap between the slidable ring and the rotary shaft and adhesion of the packing or the like. The ring which become non-slidable causes separation of the sealing faces and leakage of medium.

SUMMARY OF THE INVENTION

An object of the invention is to provide a method and an apparatus for predicting abnormality of a mechanical seal.

Another object of the invention is to provide a method and apparatus for predicting leakage of medium.

In accordance with the present invention, a sensor is set adjacently to an outer face of a slidable ring for detecting the displacement of the slidable ring. The data from the sensor is processed in an appropriate data processor. The data is analysed in various manners. In a preferable embodiment of the invention, the wave form of the displacement is drawn and the shape of the wave form is analyzed. In another preferable embodiment, the changing of the amplitude of the wave is analyzed. The prediction of the leakage can be carried out from such analysis. An additional sensor may be set adjacently to an outer face of a rotary shaft. A plurality of signals from the sensors are compared each other. In a preferable embodiment, the wave forms are drawn from the signals and they are compared to predict abnormality.

The sensors adjacent to the slidable ring and also the sensor adjacent to the rotary shaft may be equiped at several positions. In a preferable embodiment, each two sensors are positioned at 90 degree angle. The number of sensors may be increased and the angle between the sensors can be changed. In the preferable embodiment, Lissajous' figure are drawn from a plurality of signals from a plurality of sensors. The prediction can be carried out by analysing the Lissajous' figure.

Furthermore a sensor may be equiped to detect displacement in the axial direction of the slidable ring. More reliable prediction can be performed.

DETAILED DESCRIPTION OF THE PREFERRED EMBODIMENTS

Figure 1:
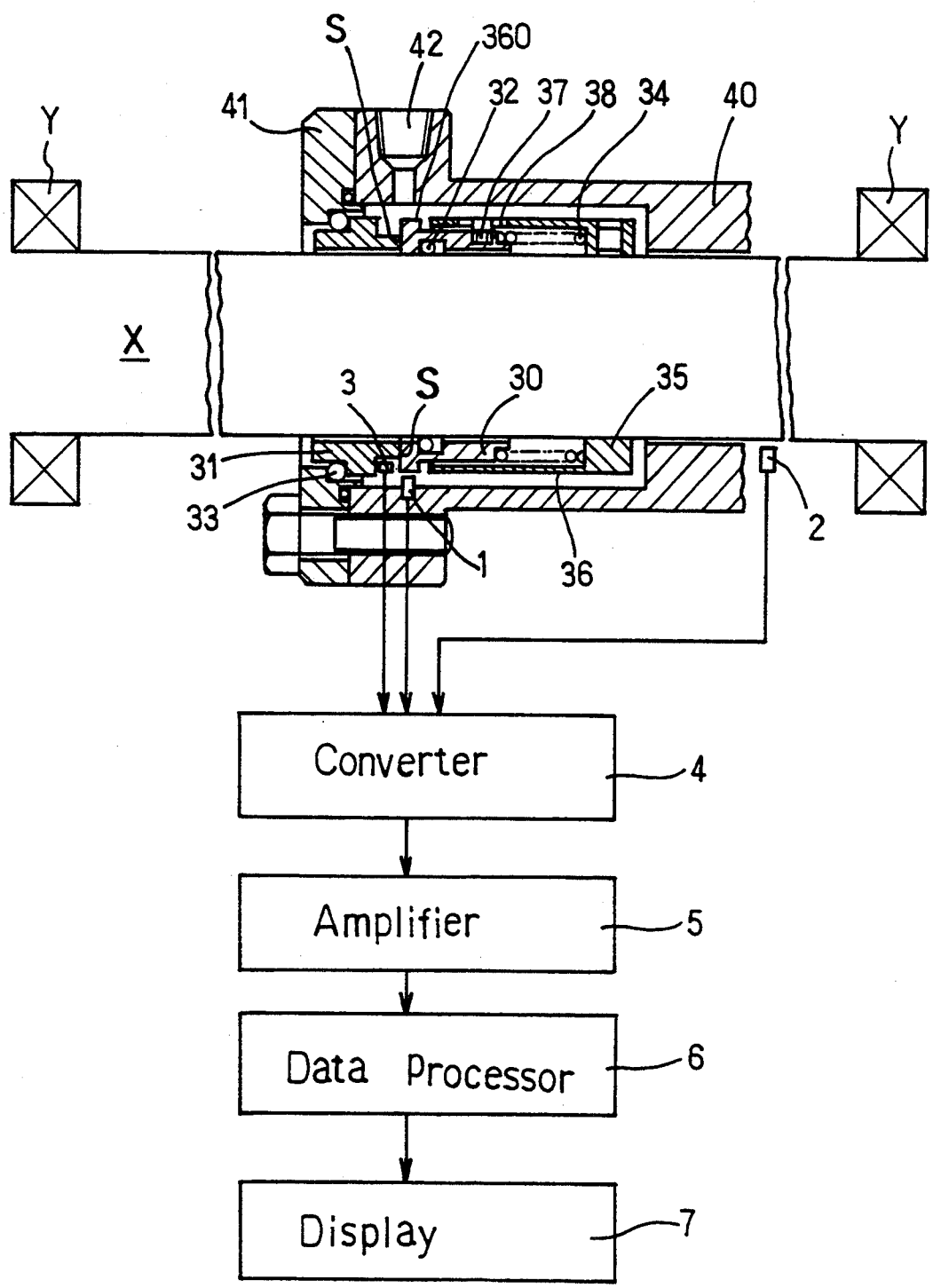
FIG. 1 is a sectional view in the axial direction showing one embodiment of an apparatus of the invention.

Now referring to FIG. 1, a rotary shaft X is supported by bearings Y at appropriate positions. The rotary shaft X is in this embodiment the shaft of an agitator (not shown). A mechanical seal unit is mounted between the rotary shaft X and a casing 40 of the agitator. The unit includes a seat ring 31 and a slidable ring 30. The seat ring 31 is mounted on the casing 40 by a gland cover 41. An O ring 33 is inserted between the seat ring 31 and the cover 41. The seat ring 31 is not rotatable and not slidable. The slidable ring 30 is mounted on the rotary shaft X and is rotated with the rotation of the rotary shaft X. The slidable ring 30 is pressed toward the seat ring 31 by a spring 34 or liquid pressure of medium in the casing 40 and the end face of the slidable ring 30 slidably abuts the end face of the seat ring 31. The end faces of the slidable ring 30 and the seat ring 31 form sealing faces S which seal the medium in the casing 40. The spring 34 is hold at the other end by a stopper 35 which has a extension 36 covering the part of the slidable ring 30. The stopper 35 and the extension 36 is secured on the rotary shaft X and the extension 36 has a hole 38 which is long in the axial direction. A screw 37 is screwed in the outer face of the slidable ring 30 through the hole 38. The top part of the screw 37 is hooked at the hole 38 in the rotating direction in order to rotate the slidable ring 30 together with the rotary shaft X and the stopper 35. Since the hole 38 is so long as to allow the slide-movement of the slidable ring 30 in the axial direction. A O ring 32 is installed between the inner face of the slidable ring 30 and the outer face of the rotary shaft X to seal therebetween. The slidable ring 30 is in a so-called floating condition both in the axial and radial direction. In the axial direction the slidable ring 30 is floated by the slide movement. In radial direction the slidable ring 30 is floated by the cushion working of the O ring 32. By virtue of the floating action, the slidable ring 30 can compensate the vibration and movement of the rotary shaft X both in the axial and radial directions. It is important to note the fact that the displacement of the slidable ring 30 is independent from the displacement of the rotary shaft X by the floating effect of the slidable ring 30 as far as the slidable ring 30 normally works. A flushing hole 42 is formed on the casing 40 to flush the outer part of the slidable ring 30 and the seat ring 31.

A method and an apparatus of the invention are adapted to the mechanical seal unit in order to predict leakage of the medium. A radial displacement sensor 1 is set at the inner part of the casing 40 and it is adjacent to the outer face of the slidable ring 30 to detect the displacement of the slidable ring 30 in the radial direction. The radial displacement sensor 1 supplies a signal which represents the distance of the outer face of the slidable ring 30 from itself. The distance is varied as the slidable ring 30 rotates since the slidable ring 30 is in said floating condition. In other word, the slidable ring 30 and the sealing faces S are not coaxial when the slidable ring 30 normally and slidably rotates. The signal supplied from the radial displacement sensor 1 is fed to a converter 4. The radial displacement sensor 1 may be a eddy-current sensor or an optical sensor or the like.

Figure 3:
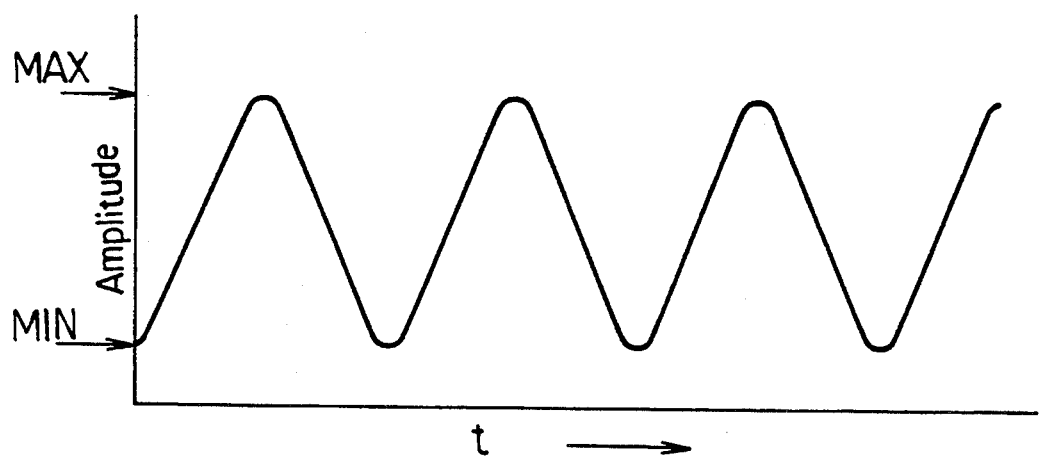
FIG. 3 is a graph showing a wave form of amplitude of displacement of a slidable ring.
Figure 4:
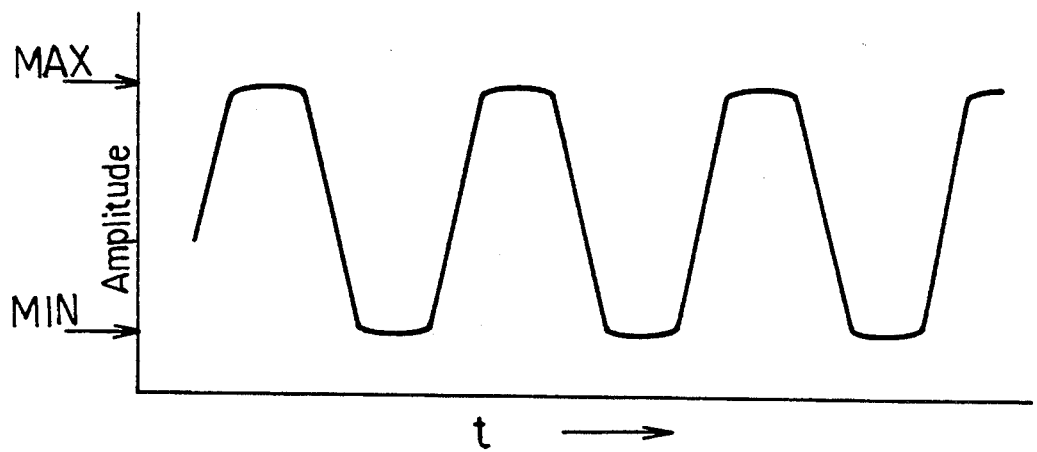
FIG. 4 is a graph showing a wave form of amplitude of displacement of a slidable ring losing floating effect.

The signal is converted to predetermined type of signal and sent to a amplifier 5 where the signal is amplitude. Then the signal is supplied to a data processor 6. A computer or the like can be utilized as the data processor 6. The results form the data processor 6 is indicated on a display 7. The display may be a CRT, a printer and an alarm or the like. According to the experimental results by the inventors of this invention, the wave form of the signal is smooth when the slidable ring 30 is in the floating condition as shown in FIG. 3. When the slidable ring 30 is not in the substantial floating condition, the wave form is not smooth in particular at the peak of the wave as shown in FIG. 4.

Figure 5:
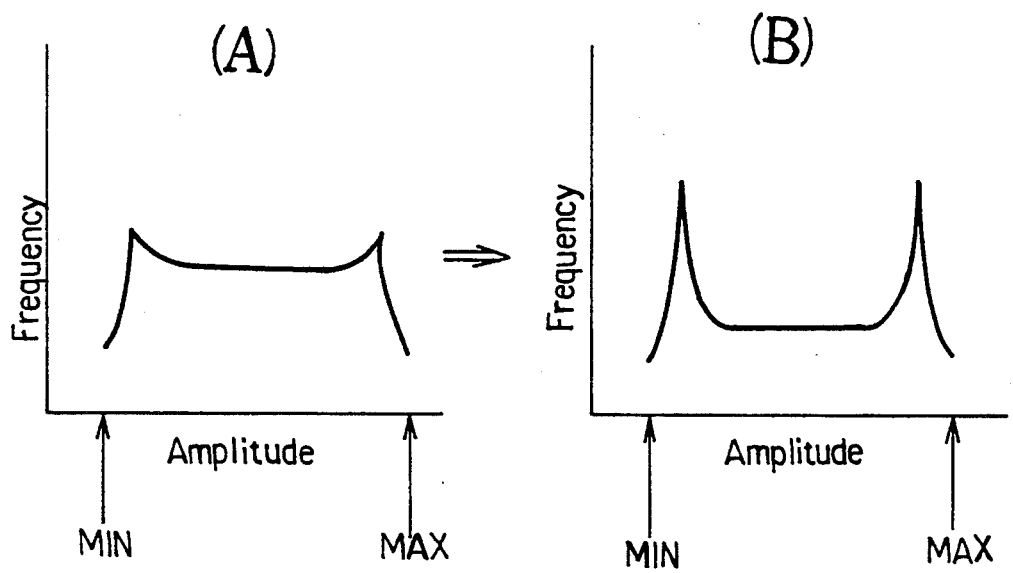
FIG. 5 is a graph showing one embodiment of a method of the invention.

The data processor 6 analyses the wave form of the signal and determines whether the mechanical seal is in normal condition or not. One method of the analysis of the wave form is shown in FIG. 5. The abscissa expresses the amplitude of the wave form and the ordinate expresses the frequency of the appearance of the exact amplitude. When the floating condition of the slidable ring 30 becomes worse, the frequency increases around both the minimum and the maximum amplitude.

Figure 6:
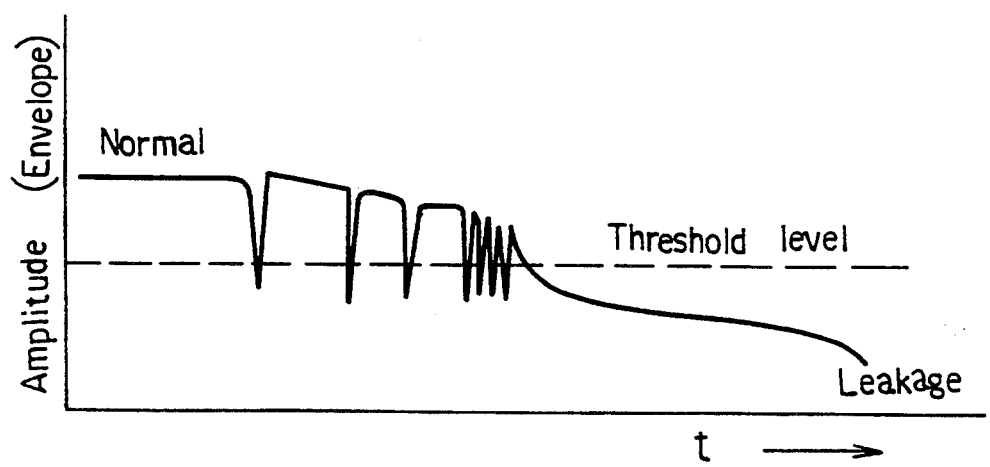
FIG. 6 is a graph showing another embodiment of a method of the invention.

As the floating condition of the slidable ring 30 becomes worse, the amplitude of the signal detected by the radial displacement sensor 1 changes, usually it decreases. The change of the amplitude of the signal may be utilized to predict abnormality of the mechanical seal. FIG. 6 shows the wave form of the envelope of the amplitude of the slidable ring 30. It is obvious that the amplitude decreases as the working time passes. The data processor 6 sets the threshold level of amplitude and counts the number of times the amplitude goes down below the threshold level. The data processor 6 may calculate the velocity of increasing of the number.

The signal of the displacement of the slidable ring 30 further represents the extent of deformation of the O ring 32, which can be used to analyse the condition of the mechanical seal unit.

Figure 7:
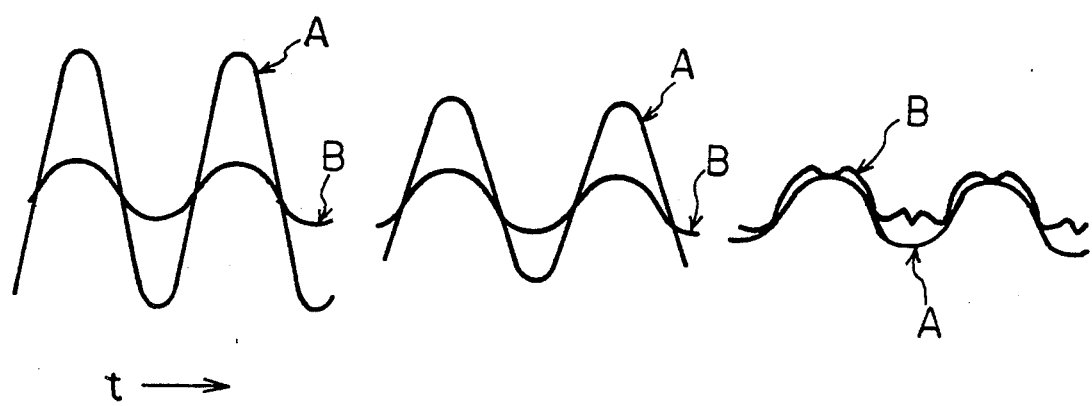
FIG. 7 is a graph showing another embodiment of a method of the invention.

As shown in FIG. 1, further a shaft displacement sensor 2 may be equiped adjacently to the rotary shaft X in order to detect the displacement of the rotary shaft X. The signal detected by the shaft displacement sensor 2 is fed to the converter 4, the amplifier 5 and the data processor 6. According to the experimental results of the inventors, the displacement of the rotary shaft X is usually smaller than the displacement of the slidable ring 30 in many cases. The data processor 6 can compare the signal of the slidable ring 30 with the signal of the rotary shaft X to determine if the mechanical seal unit is abnormal. FIG. 7 shows two wave forms. (A) indicates the wave form of the displacement in the radial direction of the rotary shaft X and (B) indicates the same wave form of the slidable ring 30. The wave form B becomes smaller as working time is passing and the wave form B will substantially coincident with the wave form A when the slidable ring 30 is adhered on the rotary shaft X and the floating effect is substantially lost. The data processor 6 predetermines a standard of approximation between the wave forms A and B and then predict the leakage of the medium from the mechanical seal unit based on the standard.

The signal from the shaft displacement sensor 2 also may represent abnormality of the bearing Y such as wear or the like.

Figure 2:
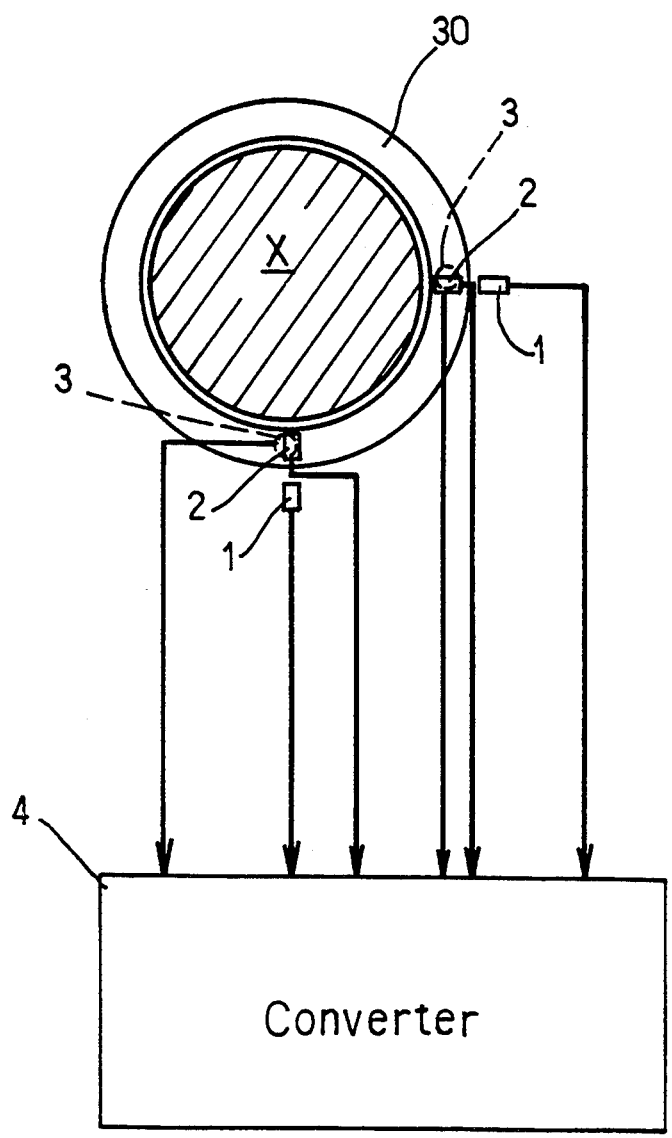
FIG. 2 is the sectional view in the radial direction of the embodiment of FIG. 1.
Figure 8:
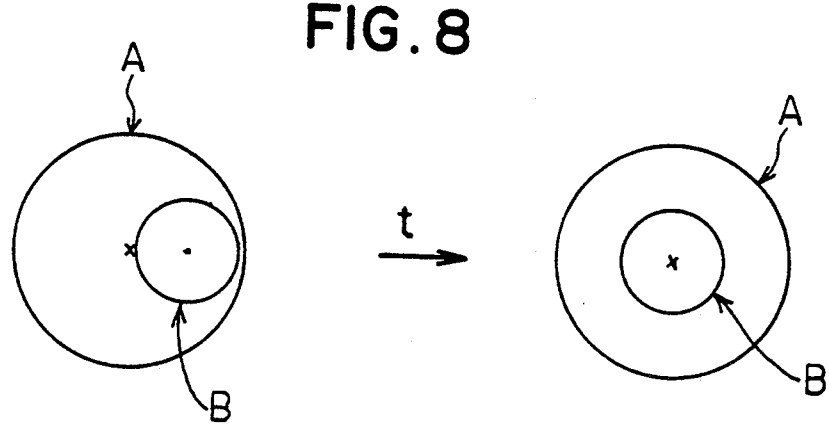
FIG. 8 is a graph showing a further embodiment of a method of the invention.

The radial displacement sensor 1 and also the shaft displacement sensor 2 may be equiped at several positions as shown in FIG. 2. In the embodiment of FIG. 2, two of the radial displacement sensors 1 and the shaft displacement sensors 2 are positioned at 90 degree angle. The number of the radial displacement sensor 1 and the shaft displacement sensor 2 may be increased and the angle between the sensors can be changed. From a plurality of signals from a plurality of sensors each at the slidable ring 30 and the rotary shaft X, the data processor 6 can draw a Lissajous' figure as shown in FIG. 8. (A) is the Lissajous' figure of the slidable ring 30 and (B) is the figure of the rotary shaft X. At the first stage of working time of the mechanical seal unit, the slidable ring 30 is in good floating condition, therefore the figure A and B are not coaxial. As the working time passes, the center of the figure A becomes close to the center of the figure B. Furthermore, it is expected that the shape of the Lissajous' figure A may change as the floating effect of the slidable ring 30 becomes lost. From such Lissajous' figure, the leakage and abnormality of the mechanical seal unit can be predicted.

Figure 9:
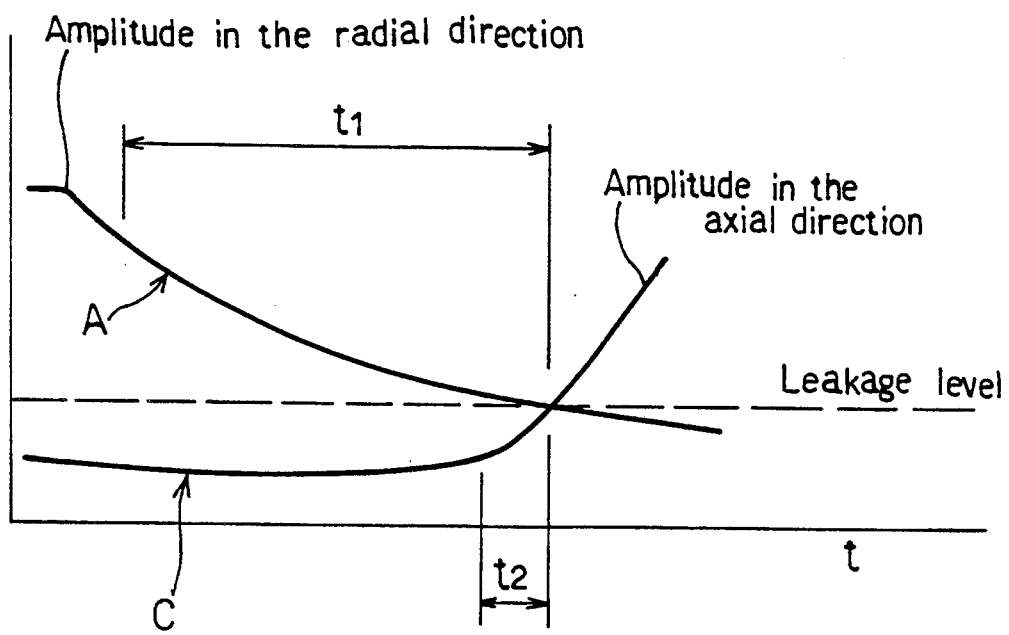
FIG. 9 is a graph showing a further embodiment of a method of the invention.

An axial displacement sensor 3 is further set in the embodiment of FIG. 1 in order to detect the displacement of the slidable ring 30 in the axial direction. The slidable ring 30 has a outer part 350 projecting in the radial direction. The axial displacement sensor 3 is positioned adjacently to the outer part 350 and detect the distance to the end face of the outer part 350. The axial displacement sensor 3 is also equiped at two positions distant at 90 degree angle as shown in FIG. 2. The signal from the axial displacement sensor 3 represents the displacement of the slidable ring 30 in the axial direction and also the condition of the gap of the sealing faces S, the condition of the spring 34 and the extent of wear of the sealing faces S. More reliable prediction of leakage can be carried out by virtue of using the signal from the axial displacement sensor 3. The displacement of the slidable ring 30 represents more directly occurrence of the leakage. In FIG. 9, (A) is the envelope of the amplitude in the radial direction of the slidable ring 30 detected by the radial displacement sensor 1 and (B) is the envelope of the amplitude in the axial direction of the slidable ring 30 detected by the axial displacement sensor 3. The line A begin to drop earlier than the line B begin to go up. Thus line A is more effective to predict the leakage in the earlier stage and the line B can be utilized to expect the leakage just before it.

Figure 10:
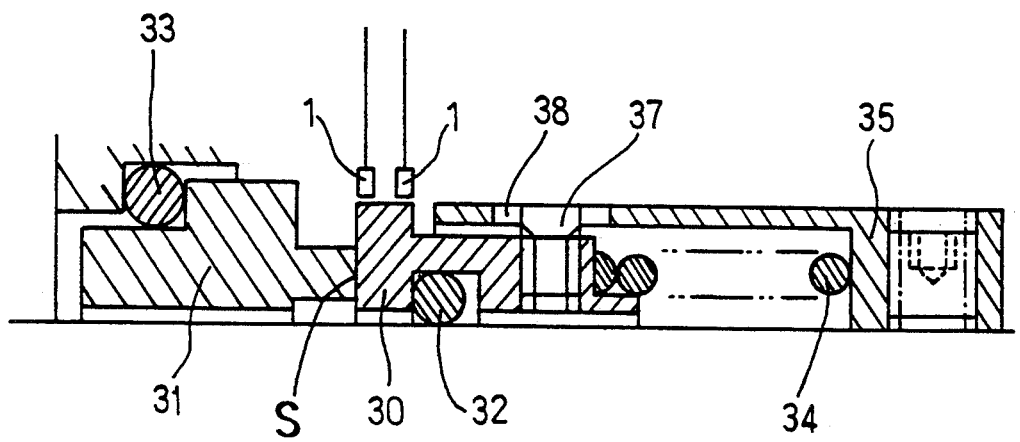
FIG. 10 is a sectional view showing another embodiment of an apparatus of the invention.

The radial displacement sensors 1,1 may be set against both one end and another end in series in the axial direction of the outer face of the slidable ring 30 as shown in FIG. 10. With two radial displacement sensors 1, the signal representing the inclination of the slidable ring 30 can be obtained. It is very important that the slidable ring 30 is so mounted on the rotary shaft X as to settle the sealing faces S at a right angle against the axis of the rotary shaft X to perform normal sealing ability. Two of the radial displacement sensors 1,1 positioned with some distance in axial direction can supply the signal representing the angle between the sealing faces S and the rotary shaft X. The signal can be utilized to analyse the cause of the leakage or abnormality of the mechanical seal unit.

Figure 11:
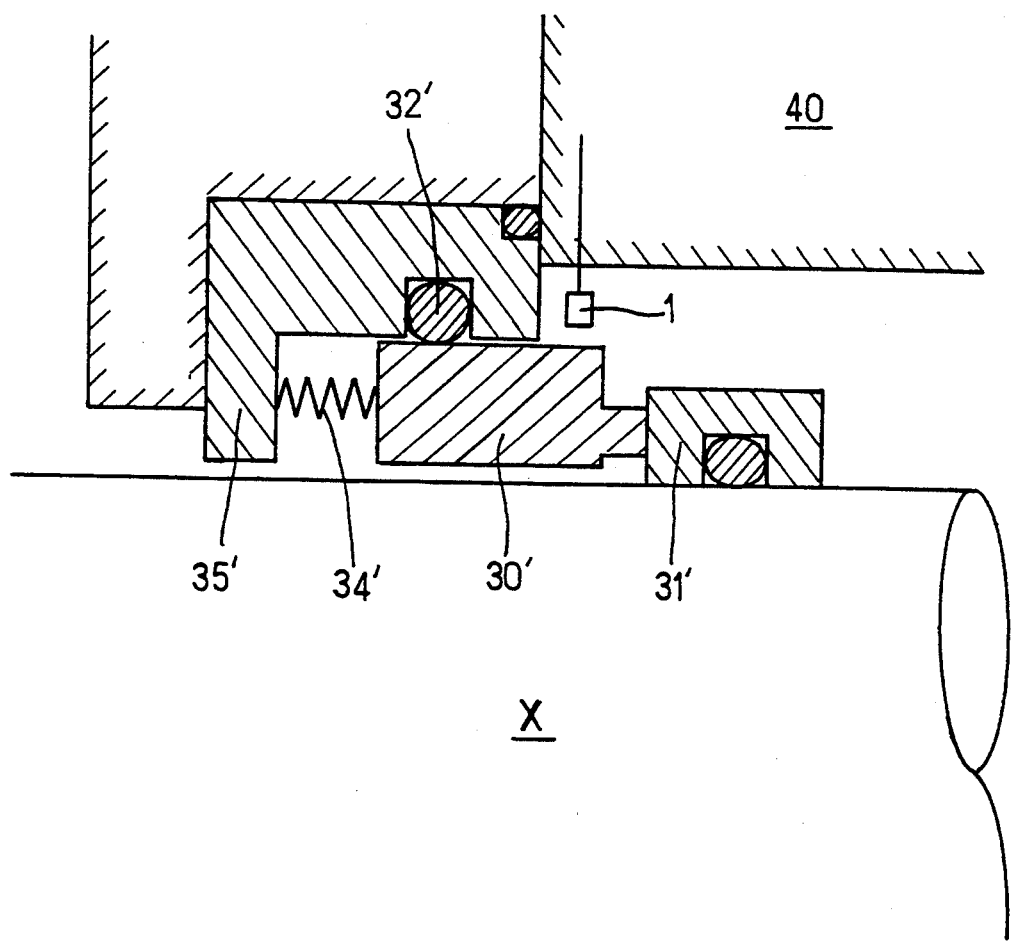
FIG. 11 is a sectional view showing another embodiment of an apparatus of the invention.

FIG. 11 shows the embodiment where this invention is applied to a stationary mechanical seal unit. In the unit, the slidable ring 30' is mounted on the casing 40 and therefore the slidable ring 30' is not rotated. The slidable ring 30' is also in condition of floating from the casing 40 by virtue of the spring 34' and the O ring 32'. The radial displacement sensor 1 is set to detect the displacement of the slidable ring 30'. The experimental results by the inventors teaches that the behavior of the displacement of the slidable ring 30' is almost same as the slidable ring 30 shown in FIG. 1. Consequently, it is possible to predict medium leakage from the stationary mechanical seal unit from the signal of the displacement of the slidable ring 30' detected by the radial displacement sensor 1.

What is claimed is:

1. A method for predicting abnormality of a mechanical seal which includes a slidable ring mounted on a rotary shaft comprising:
    detecting a displacement in a radial direction of said slidable ring as said rotary shaft rotates,
    detecting a displacement in a radial direction of said rotary shaft on which the mechanical seal is mounted as said rotary shaft rotates, and
    predicting abnormality of the mechanical seal by comparing the detected values of the displacements of the slidable ring and the rotary shaft.

2. A method for predicting abnormality of a mechanical seal which includes a slidable ring mounted on a rotary shaft comprising:
    detecting a displacement in a radial direction of said slidable ring as said rotary shaft rotates,
    detecting a displacement in a radial direction of said rotary shaft on which the mechanical seal is mounted as said rotary shaft rotates, and
    predicting abnormality of the mechanical seal by comparing the detected values of the displacements of the slidable ring and the rotary shaft wherein:
    predicting abnormality is carried out by drawing Lissajous' figure from the displacement and analysing the figure.

3. A method for predicting abnormality of a mechanical seal which includes a slidable ring surrounding a rotary shaft comprising:
    detecting a displacement both in a radial direction and in the axial direction of said slidable ring as said rotary shaft rotates,
    detecting a displacement in a radial direction of said rotary shaft as said rotary shaft rotates, and
    predicting abnormality of the mechanical seal from a plurality of the detected values of displacement.

4. An apparatus for predicting abnormality of a mechanical seal which includes a slidable ring mounted on a rotary shaft comprising:
    a sensor detecting a displacement in a radial direction of said slidable ring as said rotary shaft rotates,
    a sensor detecting a displacement in a radial direction of said rotary shaft upon which the mechanical seal is mounted as said rotary shaft rotates, and
    means for predicting abnormality of the mechanical seal by comparing the values of the displacements of the slidable ring and the rotary shaft detected by said sensors.

5. An apparatus for predicting abnormality of a mechanical seal comprising:
    a sensor detecting a displacement in a radial direction of a slidable ring of the mechanical seal,
    a sensor detecting a displacement in an axial direction of a slidable ring of the mechanical seal,
    a sensor detecting a displacement in the radial direction of a rotary shaft which the mechanical seal is mounted on,
    means for predicting abnormality of mechanical seal from the values of the displacement detected by said sensors.

6. An apparatus for predicting abnormality of a mechanical seal which includes a slidable ring mounted on a rotary shaft comprising:
    sensors detecting a displacement in a radial direction of said sildable ring at two or more points thereof as the rotary shaft rotates, and
    sensors detecting a displacement in a radial direction of said rotary shaft on which the mechanical seal is mounted at two or more points, thereof as said rotary shaft rotates,
    means for predicting abnormality of the mechanical seal from the values of the displacement detected by said sensors.

* * * * *